(12) United States Patent
Folks

(10) Patent No.: US 9,527,096 B1
(45) Date of Patent: Dec. 27, 2016

(54) METHODS AND SYSTEMS FOR A SPRINKLER SYSTEM

(71) Applicant: Mark Folks, Leander, TX (US)

(72) Inventor: Mark Folks, Leander, TX (US)

( * ) Notice: Subject to any disclaimer, the term of this patent is extended or adjusted under 35 U.S.C. 154(b) by 0 days.

(21) Appl. No.: 14/949,685

(22) Filed: Nov. 23, 2015

(51) Int. Cl.
  *B05B 12/02* (2006.01)
  *B05B 12/04* (2006.01)
  *B05B 15/06* (2006.01)
  *B05B 15/10* (2006.01)
  *A01G 25/02* (2006.01)
  *E04H 17/14* (2006.01)
  *B05B 3/06* (2006.01)

(52) U.S. Cl.
  CPC ........... *B05B 12/02* (2013.01); *B05B 3/06* (2013.01); *B05B 15/065* (2013.01); *B05B 15/10* (2013.01)

(58) Field of Classification Search
  CPC ............ B05B 3/06; B05B 12/02; B05B 15/06; B05B 15/061; B05B 15/062; B05B 15/065; B05B 15/10; A01G 25/00; A01G 25/02; A01G 25/16; A01G 25/12; A01G 25/165; E04H 17/14; E04H 17/1421
  USPC ............ 239/1, 11, 66, 67, 70, 200, 201, 239/203–207, 266, 273, 276, 280, 289, 239/DIG. 15; 47/48.5; 256/1
  See application file for complete search history.

(56) References Cited

U.S. PATENT DOCUMENTS

| | | | | |
|---|---|---|---|---|
| 2,940,466 A | * | 6/1960 | Speights | A01G 25/00 137/356 |
| 3,425,630 A | * | 2/1969 | Fessler, Sr. | A01G 25/00 137/356 |
| 3,701,477 A | * | 10/1972 | Matt et al. | B05B 15/062 239/276 |
| 3,865,309 A | * | 2/1975 | Greenhalgh | B05B 1/20 239/268 |
| 3,933,311 A | * | 1/1976 | Lemelson | B05B 1/18 239/276 |
| 5,007,587 A | * | 4/1991 | Daroca | B05B 15/062 239/276 |
| 6,168,092 B1 | * | 1/2001 | Schneider | A01G 25/02 239/203 |
| 6,173,906 B1 | * | 1/2001 | Von Kerens | E04H 17/1413 239/273 |
| 7,654,473 B2 | * | 2/2010 | Hibberd | A01G 25/02 239/266 |
| 2010/0127097 A1 | * | 5/2010 | Frank | A01G 25/00 239/200 |

* cited by examiner

*Primary Examiner* — Darren W Gorman
(74) *Attorney, Agent, or Firm* — Pierson IP, PLLC

(57) ABSTRACT

Embodiments disclosed herein describe sprinkler systems that are integrated into a fence. More specifically, embodiments relate to a sprinkler system with sprinkler heads that are configured to be extended from a top surface of the fence when in operation and recessed into the fence when not in use.

20 Claims, 4 Drawing Sheets ments relate to a sprinkler system with sprinkler heads that are configured to be extended when in operation and recessed into the fence when not in use.

METHODS AND SYSTEMS FOR A SPRINKLER SYSTEM

BACKGROUND INFORMATION

Field of the Disclosure

Examples of the present disclosure relate to systems for a sprinkler system that is integrated into a fence. More specifically, embodiments relate to a sprinkler system with sprinkler heads that are configured to be extended when in operation and recessed into the fence when not in use.

Background

Irrigation sprinklers provide irrigation to vegetation, control airborne dust, etc. In sprinkler systems, water is distributed through systems of pipes by pumping water, and then sprayed through the air via sprinkler heads.

Residential lawn sprinklers vary widely in their size, cost, and complexity. There are many different types of residential lawn sprinklers including impact sprinklers, oscillating sprinklers, drip sprinklers, and underground sprinkler systems. Residential lawn sprinklers are often temporarily attached to an outdoor water faucet. Conventional above ground residential sprinkler systems require ample space in a yard and time to set up.

Alternatively, residential lawn sprinklers may be professionally installed in the ground and coupled to a home's plumbing system. Installing a below ground sprinkler system may conserve space. However, costs associated with installing below ground sprinkler systems are high.

Additionally, when coupled to the faucet or the home's plumbing system, conventional residential lawn sprinkler do not have mechanisms to control the water pressure being emitted from each sprinkler head within the sprinkler system. Typically, this causes each of the sprinkler heads within the sprinkler system to emit water at a low pressure, which does not allow the sprinkler heads to emit water over longer distances.

Accordingly, needs exist for more effective and efficient systems and methods for sprinkler systems to be embedded within fences, and to control the water pressure associated with each sprinkler head within the sprinkler system.

SUMMARY

Embodiments disclosed herein describe sprinkler systems that are integrated into a fence. More specifically, embodiments relate to a sprinkler system with sprinkler heads that are configured to be extended from a top surface of the fence when in operation and recessed into the fence when not in use. By utilizing the fence to house elements of the sprinkler system, the elements of the sprinkler system may be protected from the elements, the sprinkler system may be permanently installed in a yard that will reduce the size of the sprinkler systems, and may hide, limit the visibility, etc. of the elements of the sprinkler system.

Embodiments may include a fence, plumbing pipe, sprinkler heads, and electric valves.

The fence or wall may be a structure that is configured to enclose an area, typically in the outdoors. The fence may have a plurality of posts that are connecting by rails, boards, wire, piping, rails, nettings, etc. In embodiments, the fence posts may include a first end configured to be inserted into or positioned on a ground surface. The fence posts may include a second end configured to be vertically offset from the ground surface.

The plumbing pipe may be configured to be connected to a water source, such as a faucet, and also be embedded within the fence. The plumbing pipe may be positioned within the posts and rails of the fence. The pluming pipe may be configured to transport fluid from the water source to the sprinkler heads.

The sprinkler heads may be configured to be embedded within the posts of the fence. The sprinkler heads may be configured to receive fluid via the plumbing pipe, and to emit, spray, distribute, etc. the fluid onto a ground surface. When emitting the fluid, the sprinkler head may pop-up above the second end of a fence post to emit water. When not emitting fluid, the sprinkler head may be embedded within the fence post. The sprinkler heads may be configured to rotate in a circular motion by force of the outgoing water, wherein the sprinkler head may pivot around the fence post. The sprinkler head may be configured to rotate a full three hundred and sixty degree, or at any desired rotational range.

The electric valves may be configured to be energized and de-energized. When an electric valve becomes energized, the electric valve may open. Responsive to the electric valve opening, the fluid may flow through the electric valve and to the sprinkler head via the plumbing pipe. Due to pressure caused by the fluid flow, the sprinkler head may rise out of the fence and deliver water to a desired location. When the electric valve is de-energized, the valve will close. Responsive to the valve closing, fluid will no longer flow across the valve to the sprinkler head. This may cause the sprinkler head to lower within the fence post, wherein when the sprinkler head is lowered within the fence post the sprinkler head may be out of sight.

Additionally, when the electric valve is closed, the fluid may flow into the next open electric valve. Thus, the system may be configured to allow only a single sprinkler head to operate at single time. This may allow the operational sprinkler head to emit fluid at the systems full water pressure.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
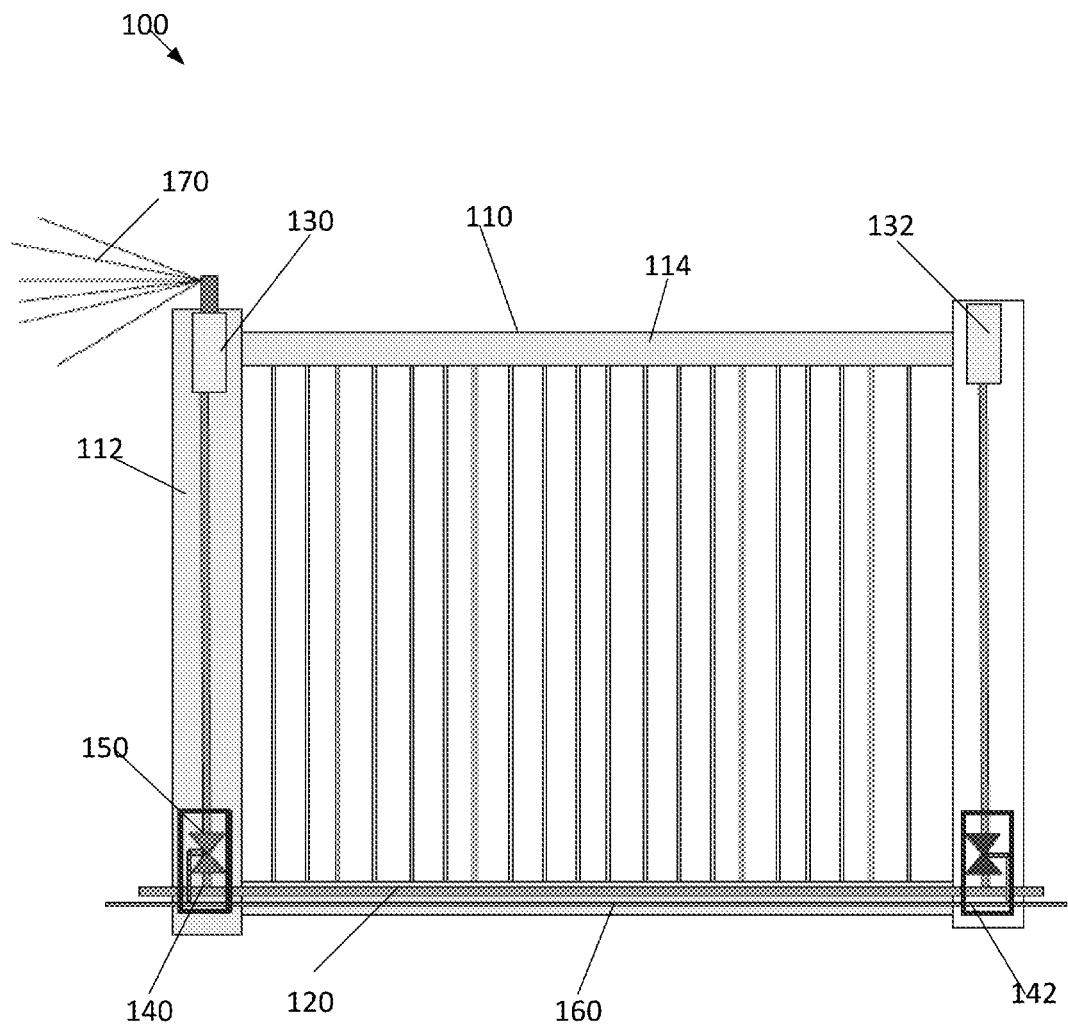
FIG. 1 depicts a sprinkler system, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Embodiments disclosed herein describe sprinkler systems that are integrated within a fence. More specifically, embodiments relate to a sprinkler system with sprinkler heads that are configured to be extended from a top surface of the fence when in operation and recessed within the fence when not in use.

Turning now to FIG. 1, FIG. 1 depicts a sprinkler system 100, according to an embodiment. Sprinkler system 100 may include a fence 110, plumbing pipe 120, sprinkler heads 130, electric valves 140, access hatches 150, and conductor wire 160.

Fence 110 may be a structure that is configured to enclose an area, typically in the outdoors. Fence 110 may be comprised of various materials, such as wood, metal, plastics, etc. Fence 110 may have a plurality of posts 112 that are connecting by rails, boards, wire, piping, rails, nettings, etc. (referred to hereinafter collectively and individually as "rails 114"). Posts 112 may include hollow channels that extend away from a surface of ground. Posts 112 may also be positions in a direction that is perpendicular to rails 114. A first end of a post 112 may be positioned adjacent to a ground surface or may be positioned below the ground surface. A second end of post 112 may be vertically offset from the ground surface. Rails 114 may include hollow channels that extend in a direction in parallel to the surface of the ground.

Plumbing pipe 120 may be configured to have a first end connected to a water source, such as a faucet or a home's plumbing system. Plumbing pipe 120 may have a second ends connected to sprinkler heads 130. Plumbing pipe 120 may be configured to transport fluid through sprinkler system 100. The shafts of plumbing pipe 120 may be embedded within the hollow channels of fence 110, such as within posts 112 and rails 114. In embodiments, plumbing pipe 120 may be comprised of various materials such as PVC, plastics, metal, or any other material suitable for transferring fluids.

Sprinkler heads 130 may be configured to be embedded within the posts of fence 110. Sprinkler heads 130 may be configured to receive fluid from plumbing pipe 120, and emit the fluid on the ground surface. When emitting fluid, sprinkler heads 130 may pop-up above the second end of post 112 to emit water. When not emitting fluid, sprinkler heads 130 may be embedded within post 112. Sprinkler heads 130 may be configured to rotate in a circular motion by force of the outgoing water, wherein sprinkler head 130 may pivot around post 112. Sprinkler head 130 may be configured to rotate a full three hundred and sixty degree, or at any desired rotational range.

Electric valves 140 may be configured to be energized and de-energized. When electric valve 140 becomes energized, electric valve 140 may open. Responsive to electric valve 140 opening, fluid may flow through plumbing pipe 120 across electric valve 140 and to sprinkler head 130. Due to pressure caused by the fluid flow, sprinkler head 130 may rise out of post 112 and deliver fluid to a desired location. When electric valve 140 is de-energized, the valve will close. Responsive to the valve closing, water will no longer flow across electric valve 140 to sprinkler head 130 causing sprinkler head 130 to lower into post 112. When sprinkler head 130 is lowered into the fence post the sprinkler head 130 may be out of sight and recessed within post 112.

Additionally, when electric valve 140 is closed, the fluid may flow into a next open, energized electric valve 140. Thus, the system may be configured to allow only a single sprinkler head 130 to operate at single time. This may allow the operational sprinkler head 130 to emit fluid at the systems full water pressure.

Access hatches 150 may be positioned within posts 112, wherein access hatches 150 are doors configured to block off and allow access to electric valves 140, plumbing pipes 120, and/or conductor wire 160. Responsive to closing access hatches 150, elements within fence 110 may not be exposed to the elements or be able to be accessed. Responsive to opening access hatches 150, a user may repair elements within fence 110.

Conductor wire 160 may be comprised of material that allows the flow of electrical current in one or more directions. A first end of conductor wire 160 may be connected to a power supply, such as an outlet, electric grid, battery, etc. Second ends of conductor wire 160 may be coupled to electric valves 140. In embodiments, conductor wire 160 may be embedded within rails 114 of fence 110. Conductor wire 160 may be configured to transmit electricity to energize and de-energize the electric valves 140 to open and close the valves. In embodiments, conductor wire 160 may be transmit the electricity to open and close the electric valves 140 based on a timer counting upward or downward. The timer may be any type of device that is configured to measure time intervals, such as a clock, stopwatch, countdown timer, etc. The timer may be configured to count upwards from zero for measuring elapsed time, or count down from a specific time interval. When a time threshold has elapsed or is reached, conductor wire 160 may transmit electricity to a different electric valve 140. Responsive to electricity being transmitted to a different electric valve 140, the timer may reset and be incremented or decremented. Accordingly, in embodiments, multiple electric valves 140 may not simultaneously be opened.

As depicted in FIG. 1, fence 110 may have multiple posts 112 with multiple sprinkler heads 130, 132, wherein a first sprinkler head 130 is opened and a second sprinkler head 132 is closed. Furthermore, fence 110 may have multiple electric valves 140, 142, wherein a first electric valve 140 corresponding to the first sprinkler head 130 is energized, and a second electric valve 142 corresponding to the second sprinkler head 132 is de-energized. Responsive to energizing first electric valve 140, first sprinkler head 130 may receive water via plumbing pipes 120 and be extended away from a top surface of post 112 to emit fluid 170. Because second electric valve 142 is de-energized, second sprinkler head 132 may be recessed within post 112.

Accordingly, by having only a single sprinkler head 130 open, sprinkler head 130 may be configured to emit fluid at a greater pressure at greater distances, than if a plurality of sprinkler heads were open simultaneously.

Figure 2:
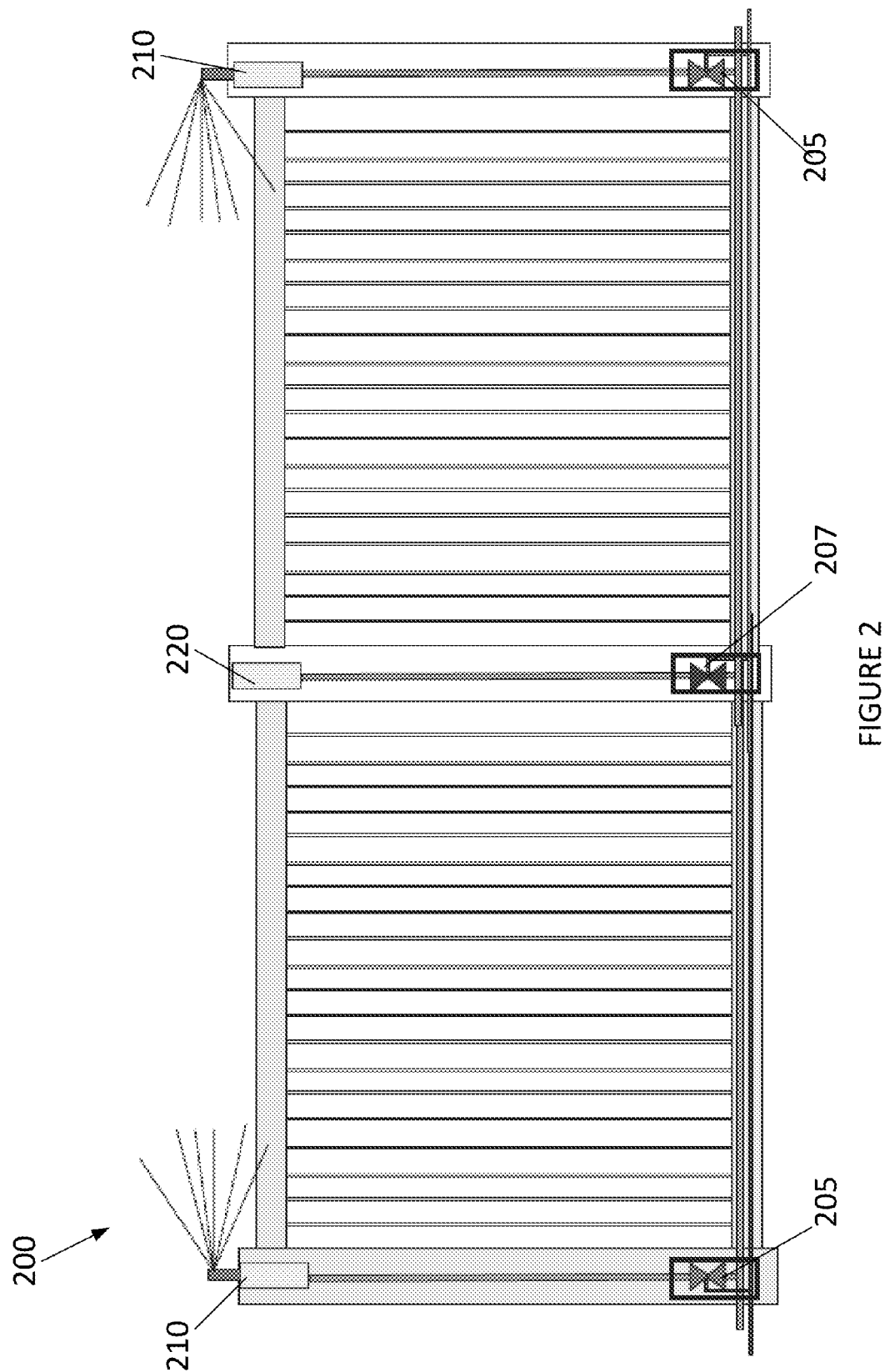
FIG. 2 depicts a sprinkler system, according to an embodiment.

FIG. 2 depicts a sprinkler system 200, according to an embodiment. Elements depicted in sprinkler system 200 may be substantially the same as those depicted in sprinkler system 100. For the sake of brevity an additional description of these elements is omitted.

As depicted in FIG. 2, multiple electric valves 205 may be energized simultaneously, while other electric valves 207 are simultaneously de-energized. Responsive to multiple electric valves 205 being energized, multiple sprinkler heads 210 may be extended and positioned away from a top surface of the fence posts. The sprinkler head 220 associated with a de-energized electric valve 207 may remain recessed within the fence post. The number of electric valves 205 being energized simultaneously may be based on a desired water pressure to emit the fluid, wherein the desired water pressure is based on a desired distance to emit the fluid.

Figure 3:
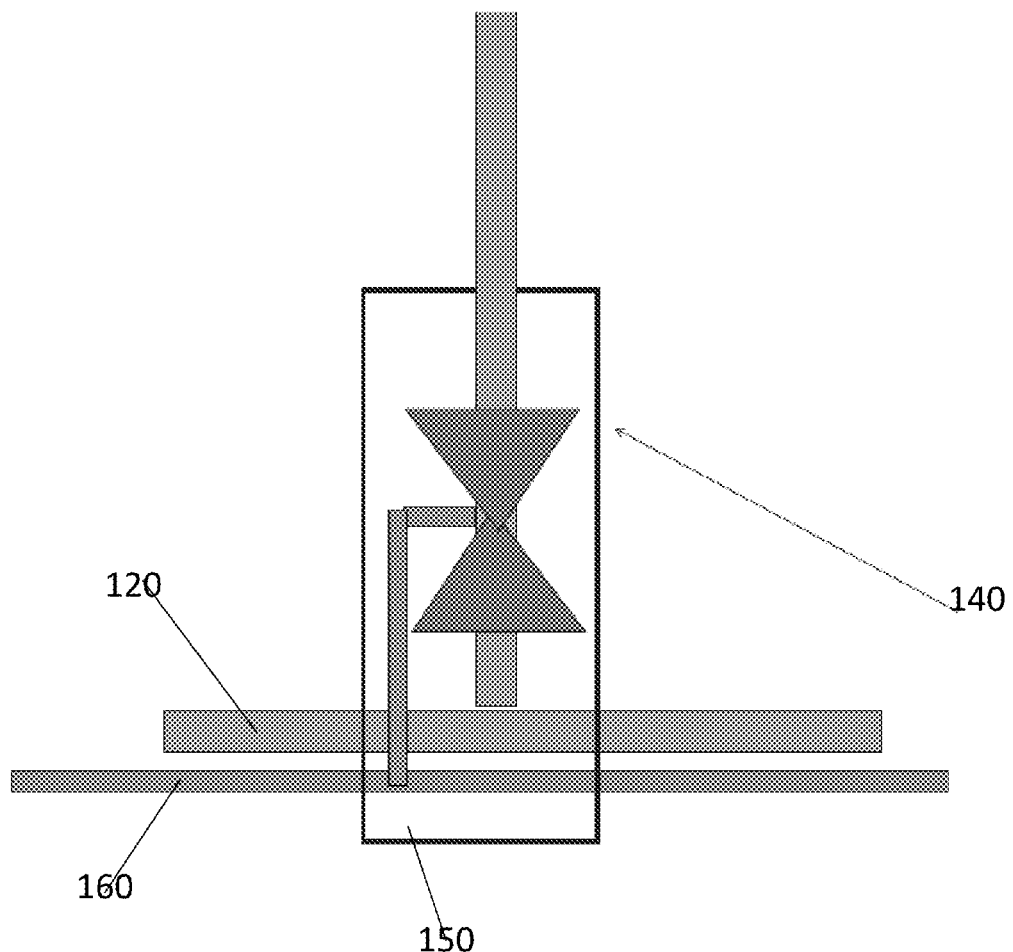
FIG. 3 depicts an electric valve, according to an embodiment.

FIG. 3 depicts an electric valve 140, according to an embodiment. Elements depicted in electric valve 140 may be substantially the same as those depicted in sprinkler system 100. For the sake of brevity an additional description of these elements is omitted.

As depicted in FIG. 3, conductor wire 160 may be directly coupled to electric valve 140, wherein conductor wire 160 and plumbing pipes 120 may be positioned within the same hollow channels of fence 110. By positioning conductor wire 160 and plumbing pipes 120 within the hollow channels of fence 110 the amount of space required for sprinkler system 100 may be reduced.

Responsive to energizing electric valve 140 via energy supplied by conductor wire, electric valve 140 may open and allow fluid to flow through the valve to open a sprinkler head. When conductor wire 160 no longer supplies energy to electric valve 140, electric valve 140 may close and fluid may not travel to the sprinkler head. When the sprinkler head no longer receives fluid, the sprinkler head may move to be recessed within the fence. Accordingly, the water pressure caused by the fluid flowing through plumbing pipes 120 to the sprinkler head may supply sufficient force to move the sprinkler head upward. Yet, when electric valve 140 is closed, no water may flow to the sprinkler head, and thus there will be no water pressure to move the sprinkler head upward.

Figure 4:
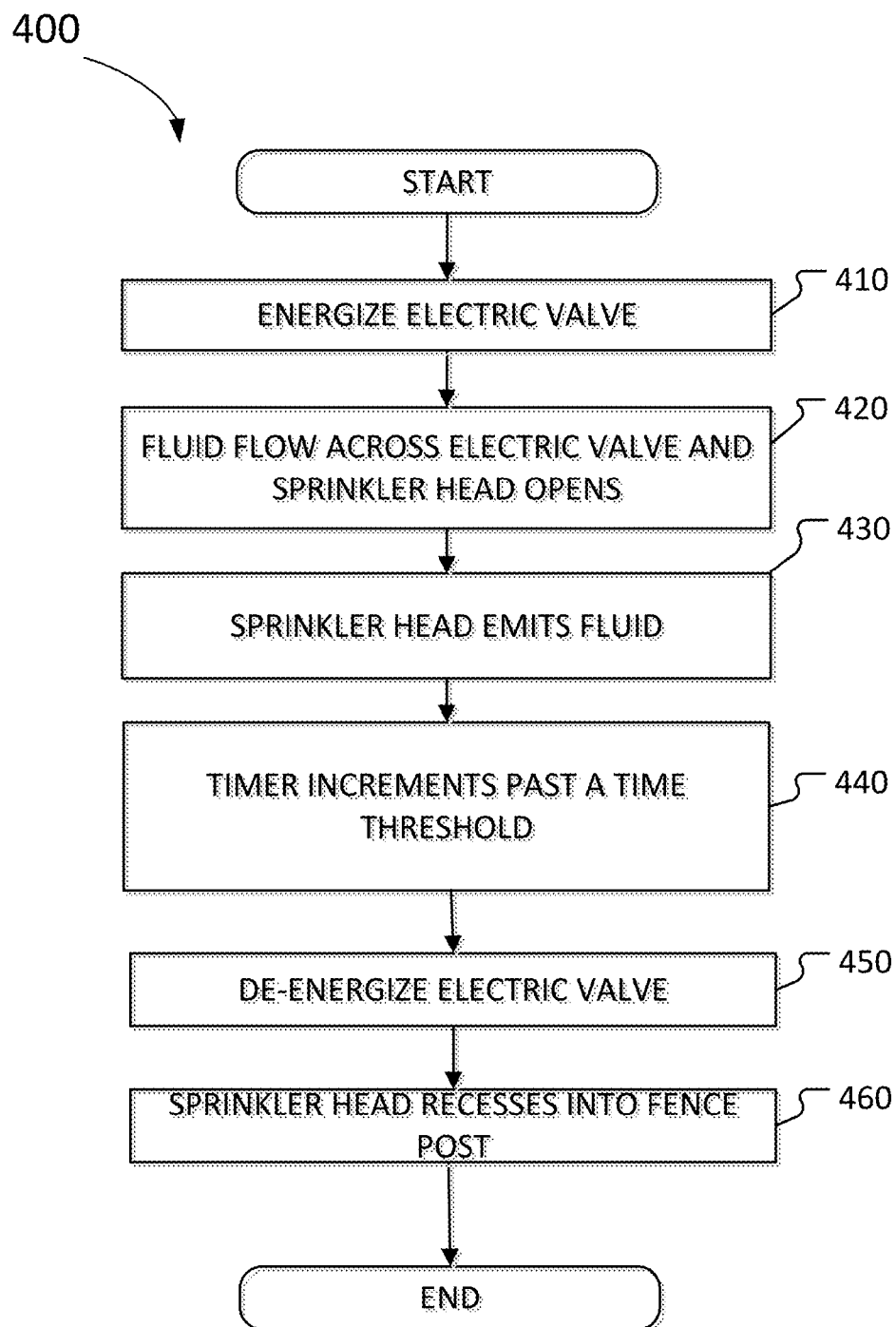
FIG. 4 depicts a method for a sprinkler system embedded within a fence, according to an embodiment.

FIG. 4 depicts a method 400 for a sprinkler system embedded within a fence, according to an embodiment. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At operation 410, an electric valve may be energized opening the valve, allowing fluid to flow across the electric valve. Responsive to energizing the electric valve, a timer or clock may be initiated.

At operation 420, responsive to fluid flowing across the electric valve, fluid pressure within plumbing pipes against a sprinkler head may cause the sprinkler head to pop open. When the sprinkler head pops open, the sprinkler head may move from a first position embedded within the fence, to a second position above a top surface of the fence.

At operation 430, the sprinkler head may emit fluid, such as water. The sprinkler head may emit fluid to distances on a lawn based on the fluid pressure, wherein the greater fluid pressure may allow the sprinkler head to emit fluid at greater distances. The fluid pressure through the sprinkler system may be based on the number of energized electric valve, wherein the greater number of simultaneously energized valves, the lower the fluid pressure through the sprinkler system. In certain embodiments, only a single electric valve may be energized at any given time, such that the system retains a maximum fluid pressure.

At operation 440, the timer may be incremented past a time threshold, wherein the time threshold may be any desired time period. The time threshold may be associated with a time period that a user desires certain sections of their lawn to be water, wherein different sections correspond with different sprinkler heads. In certain embodiments, different sections may have the same time threshold or different time thresholds.

At operation 450, the electric valve becomes de-energized responsive to the timer being incremented past the time threshold. When the electric valve becomes de-energized the valve may close, and fluid may no longer cross the valve.

At operation 460, fluid may no longer apply pressure to the sprinkler head, such that the sprinkler head may recess back into the fence.

Reference throughout this specification to one embodiment", an embodiment", "one example" or "an example" means that a particular feature, structure or characteristic described in connection with the embodiment or example is included in at least one embodiment of the present invention. Thus, appearances of the phrases in one embodiment", in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagrams.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A sprinkler system comprising:
    a fence with a plurality of posts and rails, the posts and rails including hollow channels, wherein the posts are positioned in a direction perpendicular to the rails;
    plumbing piping positioned within the hollow channels in the posts and the rails, the plumbing piping being configured to transport fluid within the fence;
    conductive wire positioned within the hollow channels in the posts and the rails, the conductive wire being configured to transport electricity through the fence;
    a first electric valve positioned at an intersection of a first post of the plurality of posts and a first rail of the plurality of rails, the first electric valve being configured to open to allow the fluid to flow across the first electric valve and being configured to close to not allow the fluid to flow across the first electric valve, the first electric valve being configured to receive the fluid via the plumbing piping and electricity via the conductive wire; and
    a sprinkler head positioned within the first post, wherein when the first electric valve is opened, at least a portion of the sprinkler head is configured to be elevated from an upper surface of the first post and emit the fluid, and when the first electric valve is closed, the sprinkler head is embedded within the first post.

2. The sprinkler system of claim 1, further comprising:
    a timer configured to control the opening and closing of the first electric valve, wherein a time period is initiated responsive to opening the first electric valve, and when the time period lapses the first electric valve closes.

3. The sprinkler system of claim 2, further comprising:
    a plurality of electric valves and a plurality of sprinkler heads, each of the plurality of electric valves being associated with a different one of the sprinkler heads, wherein only a single electric valve of the plurality of electric valves is configured to be opened at a given time.

4. The sprinkler system of claim 3, wherein responsive to the time period lapsing, a second electric valve of the plurality of electric valves opens.

5. The sprinkler system of claim 1, wherein when the first electric valve is opened, fluid flowing through the plumbing piping creates pressure that moves the portion of the sprinkler head to be elevated from the upper surface of the first post.

6. The sprinkler system of claim 5, wherein when the first electric valve is closed, a lack of pressure on the sprinkler head causes the sprinkler head to be recessed and embedded within the first post.

7. The sprinkler system of claim 1, wherein the sprinkler head is configured to rotate around the first post to emit the fluid in a three hundred sixty degree radius.

8. The sprinkler system of claim 1, further comprising:
    an access hatch positioned within the first post, wherein when the access hatch is opened the first electric valve can be accessed.

9. The sprinkler system of claim 1, wherein a distance that the sprinkler head emits fluid is based on a fluid pressure within the plumbing piping.

10. The sprinkler system of claim 9, wherein the fluid pressure within the plumbing piping is based on a number of electric valves being opened.

11. A method for operating a sprinkler system comprising:
    forming a fence above a ground surface, the fence including a plurality of posts and rails, the posts and rails including hollow channels, wherein the posts are positioned in a direction perpendicular to the rails;
    positioning plumbing piping within the hollow channels in the posts and the rails, the plumbing piping being configured to transport fluid within the fence;
    positioning conductive wire within the hollow channels in the posts and the rails, the conductive wire being configured to transport electricity through the fence;
    positioning a first electric valve at an intersection of a first post of the plurality of posts and a first rail of the plurality of rails,
    opening the first electric valve to allow the fluid to flow across the first electric valve, wherein the first electric valve receives the fluid via the plumbing piping and electricity via the conductive wire;
    elevating at least a portion of a first sprinkler head positioned within the first post from an upper surface of the first post, and emitting the fluid from the sprinkler head when the first electric valve is opened;
    closing the first electric valve to not allow the fluid to flow across the first electric valve; and
    embedding the sprinkler head within the first post when the first electric valve is closed.

12. The method of claim 11, further comprising:
    initiating a timer for a time period when the opening of the first electric valve occurs, wherein the closing of the first electric valve occurs when the time period lapses.

13. The method of claim 12, wherein the sprinkler system includes a plurality of electric valves and a plurality of sprinkler heads, each of the plurality of electric valves being associated with a different one of the sprinkler heads, wherein only a single electric valve of the plurality of electric valves is configured to be opened at a given time.

14. The method of claim 13, wherein responsive to the time period lapsing, a second electric valve of the plurality of electric valves opens.

15. The method of claim 11, wherein when the first electric valve is opened, fluid flowing through the plumbing piping creates pressure that moves the portion of the sprinkler head to be elevated from the upper surface of the first post.

16. The method of claim 15, wherein when the first electric valve is closed, a lack of pressure on the sprinkler head causes the sprinkler head to be recessed and embedded within the first post.

17. The method of claim 11, further comprising:
rotating the sprinkler head around the first post to emit the fluid in a three hundred sixty degree radius.

18. The method of claim 11, further comprising:
opening an access hatch positioned within the first post to access the first electric valve.

19. The method of claim 11, wherein a distance that the sprinkler head emits fluid is based on a fluid pressure within the plumbing piping.

20. The method of claim 19, wherein the fluid pressure within the plumbing piping is based on a number of electric valves being opened.

* * * * *